United States Patent [19]
Grenon et al.

[11] Patent Number: 5,987,060
[45] Date of Patent: Nov. 16, 1999

[54] SYSTEM AND METHOD OF RADIO COMMUNICATIONS WITH AN UP-DOWN DIGITAL SIGNAL LINK

[75] Inventors: Jean-Francois Grenon, Seattle; Gary Allen Martek, Kent, both of Wash.; Patric McDonald, Granite Bay; Timothy Patrick Murphy, Nevada City, both of Calif.; Colin J. R. Pallemaerts, Des Moines, Wash.; Jerome Prismantas, Kent, Wash.; F. Roland Svensson, Issaquah, Wash.

[73] Assignee: Innova Corporation, Seattle, Wash.

[21] Appl. No.: 08/874,661

[22] Filed: Jun. 13, 1997

[51] Int. Cl.$^6$ .............................. G01R 31/08; H04M 1/24
[52] U.S. Cl. ......................... 375/213; 375/220; 375/221; 375/224; 375/257; 370/249; 370/293; 455/3.2; 455/14; 455/15; 379/5; 379/29; 379/30; 348/10
[58] Field of Search ..................................... 375/211, 214, 375/219, 220, 257, 259, 213, 221, 224; 370/276, 293, 295, 249; 455/7, 14, 15, 39, 73, 3.2; 379/5, 29, 30; 348/10

[56] References Cited

U.S. PATENT DOCUMENTS

| | | | |
|---|---|---|---|
| 3,912,882 | 10/1975 | Beerbaum | 379/5 |
| 4,259,746 | 3/1981 | Sandstedt | 359/145 |
| 4,347,618 | 8/1982 | Kavouras et al. | 375/259 |
| 5,649,318 | 7/1997 | Lusignan | 455/3.2 |
| 5,768,341 | 6/1998 | Pryor et al. | 379/22 |

FOREIGN PATENT DOCUMENTS 0 680 156  2/1995  European Pat. Off. .

*Primary Examiner*—Amanda T. Le
*Attorney, Agent, or Firm*—Graham & James LLP

[57] ABSTRACT

The invention provides radio communications with an up-down signal link. In accordance with the purpose of the invention, as embodied and broadly described herein, the invention is directed to a method, system and computer readable medium with program instructions (hereafter collectively referred to as "the invention"). The invention includes receiving a downstream signal in a receiver portion of an outdoor unit, producing in the receiver portion of the outdoor unit an intermediate frequency (IF) signal from the downstream signal, and processing the IF signal in the receiver portion of the outdoor unit to produce a clean line code signal. The invention further includes processing the clean line code signal in the receiver portion of the outdoor unit to produce a modulated signal, and providing the modulated signal via an interface portion of the down-link to an indoor unit, wherein the producing and processing, respectively, of the IF, clean line code and modulated signals in the outdoor unit provides a high, constant signal-to-noise ratio on the down-link, and wherein the modulated signal is converted to a binary signal in the indoor unit. The invention additionally includes providing an upstream signal over an up-link to a transmitter portion of the outdoor unit, and selecting a component of the upstream signal for transmission by the outdoor unit. One aspect of the invention also includes measuring in the receiver portion of the outdoor unit a power level of the received downstream signal, wherein the measured power level is unaffected by characteristics of the down-link. Moreover, the invention includes providing loop-back connections in the indoor and outdoor units for automated testing of the indoor and outdoor units.

19 Claims, 7 Drawing Sheets

SYSTEM AND METHOD OF RADIO COMMUNICATIONS WITH AN UP-DOWN DIGITAL SIGNAL LINK

FIELD OF THE INVENTION

The invention relates to methods and systems for cabling of digital radios, and in particular relates to cabling of digital radios for microwave communications.

BACKGROUND OF THE INVENTION

Digital radio terminals have become particularly advantageous in a number of key types of communication. High frequency point to point communications are used by, among others, cellular operators, telecommunications operators, private network operators, governments, and large telecommunications operations.

Typical of conventional microwave digital radios is the use of a cable connection between an exterior antenna/transmitter portion, sometimes referred to as the Antenna Resident Unit (ARU), and an interior portion sometimes referred to as the System Interface Unit (SIU.) In conventional radios, the modulated IF signal is fed down the cable to the Indoor Unit, subjecting the signal to degradation due to varying signal-to-noise ratios, varying cable length, deterioration of the cable, environmental factors, and so on. Such degradation can result in unacceptable signal quality. In addition, conventional radios may require that the cable connecting the SIU to the ARU be equalized, especially as cable lengths increase. Such equalization can represent significant effort and, if not done properly, can also lead to unacceptable signal quality.

As a result, there has been a longfelt need for a microwave radio system which includes a cabling architecture that avoids the signal degradation long associated with conventional systems.

An additional limitation of existing radios has been the difficulty in performing loop back diagnostics on the indoor and outdoor units. This has resulted in significant maintenance costs and time for diagnosis in the event an equipment failure occurs. In typical prior art systems, some loop back testing may be performed on the indoor unit by a processor resident in the indoor unit. However, it has historically not been possible to perform significant loop back testing of the outdoor unit remotely from the indoor unit. Given that the outdoor unit is frequently mounted at some distance from the indoor unit, and frequently at or near the top of a tower, the inability to perform remote loop back testing of the outdoor unit, including testing of the RF subsystem, has raised maintenance costs significantly. In addition, prior art systems have generally not been able to handle gracefully the acknowledgment of an alarm situation. There has therefore been a need for a microwave digital radio which can perform loop back testing of both the indoor and outdoor unit under the control of a technician operating at the indoor unit, and which can communicate specific alarm conditions only where needed and where appropriate without causing redundant alarms.

SUMMARY OF THE INVENTION

The present invention substantially improves on the prior art cabling systems and methods used for connecting antenna units to their associated Indoor units. The system and method of the present invention provides a full duplex link between the Indoor unit and the Outdoor unit which includes unique modulation steps for transmitting the data across the cable.

In particular, the digital radio system of the present invention includes an interface portion which receives as its input the outgoing binary digital data signal which is to be sent up the cable, sometimes referred to herein as "upstream." The binary digital data signal is converted to a suitable line code (such as AMI, partial response or other conventional form), appropriately amplified and filtered and then combined with a clock signal in a power summer/splitter. The summer/splitter functions to combine the signals for transmission onto the cable, while at the same time maintaining isolation among the signals. The output of the summer/splitter is impedance-matched for the cable connecting the Indoor and Outdoor units (for example, at 50 ohms), and then sent onto the cable, where it is combined with DC power. DC power is provided to the cable through a conventional power inductor, and is isolated from the remaining signals by use of a capacitor.

The upstream signal is communicated over the cable to the transmitter portion of the Outdoor unit, where the three components of the signal on the cable are separated out. The data signal, in its appropriate line code form, provides the input to a buffer amplifier, and then to the conventional portion of the transmitter, where it is transmitted in a conventional manner.

The downstream signal, or the signal incoming from the antenna, is supplied to a receiver portion of the Outdoor Unit. The receiver portion amplifies and otherwise processes the incoming signal in a conventional manner, up to the point at which a baseband signal is available. Unlike conventional digital radios, in which the received IF signal is sent down the cable to the Indoor unit for further processing, the present invention demodulates the IF signal at the Outdoor Unit until a clean line code signal is developed. At that point, the clean line code signal is re-modulated, typically by pulse amplitude modulation, onto a carrier frequency selected for use with the cable. The amplitude modulated signal is then supplied down the cable to the power summer/splitter resident within the Indoor Unit.

The downstream portion of the power summer/splitter provides the modulated downlink signal to a demultiplexer portion of the Indoor Unit, where appropriate filtering and amplification is performed, after which the signal is demodulated and further filtered to yield a suitable line code signal. The line code signal is then converted to a binary signal in the indoor unit, demultiplexed, and supplied as the system output to other equipment.

It will be appreciated from the foregoing that a significant aspect of the present invention is the ability to provide a high, constant signal-to-noise ratio on the downlink. In addition, the present system also permits improved measurement of received power. Because the IF signal is demodulated and processed at the Outdoor Unit, the received power level can be measured at the Outdoor Unit. The power level information can then be included in the information supplied down the cable to the Indoor Unit. This permits measurement of received power without having to consider the signal level measurement and bit errors potentially induced by the cable, leading to easier linearization and more accurate calculation of link budget without having to rely on external test equipment.

Still further, the present invention permits simplified but thorough loop back testing by providing local control of loop back connections not only in both the indoor unit (IDU) and outdoor unit (ODU) of the local unit, but also in the IDU and ODU of the remote units. A control program resident in the local IDU can be accessed by a technician, who can then selectively implement loopback at each of several stages of the indoor and outdoor units, including the RF subsystem of the outdoor unit. Each loopback is controlled by the microprocessor resident in the local IDU, which may also work cooperatively with the microprocessor of the outdoor unit. In addition, automated testing of the various subsystems of the radio system may be implemented by providing a sequence in the control program to automatically step through the various stages of loopback.

The invention may be better appreciated from the following Figures, taken together with the accompanying Details Description of the Invention.

DETAILED DESCRIPTION OF THE INVENTION

Figure 1:
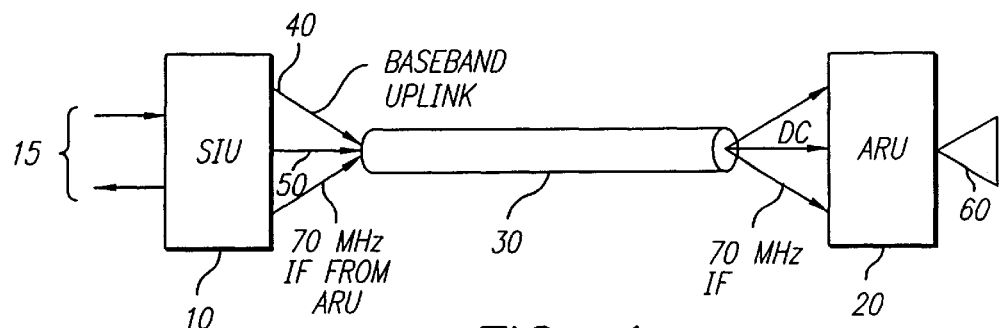
FIG. 1 illustrates in block diagram form a prior art design of microwave digital radio.

Referring first to FIG. 1, a prior art design of cable system for a microwave digital radio operating in full duplex mode may be seen. In particular, a system interface unit (SIU) 10 receives data from an input/output 15 and communicates bidirectionally with an antenna resident unit 20 via a coaxial cable 30. The SIU 10 provides data to the antenna resident unit (ARU) 20 via a base band uplink 40, and also provides DC power to the ARU 20 via a line 50. The signals on lines 40 and 50 are combined and sent up the cable to the ARU 20 in a conventional manner. The input data is typically a binary data stream and is provided by other equipment which is not relevant here. The output of the ARU 20 is then transmitted by the antenna 60 as a radio signal. In some instances, a portion of the SIU 10 will operate under microprocessor control; however, the ARU 20 typically does not include a microprocessor.

Data is also received at the antenna 60 from other radios, and the incoming data stream in prior art systems is amplified and processed to create a 70 MHz IF signal which has not been demodulated. The 70 MHz IF signal is sent downstream from the ARU 20 to the SIU 10 via the cable 30. The 70 MHz IF signal is then demodulated by the SIU 10 and an output data stream is eventually supplied at the input/output 15. It will be apparent to those skilled in the art, given the teachings hereinafter provided, that the cable system of FIG. 1 can degrade signal quality and potentially introduce errors as the result of the modulated 70 MHz IF signal being sent down the cable.

Figure 2:
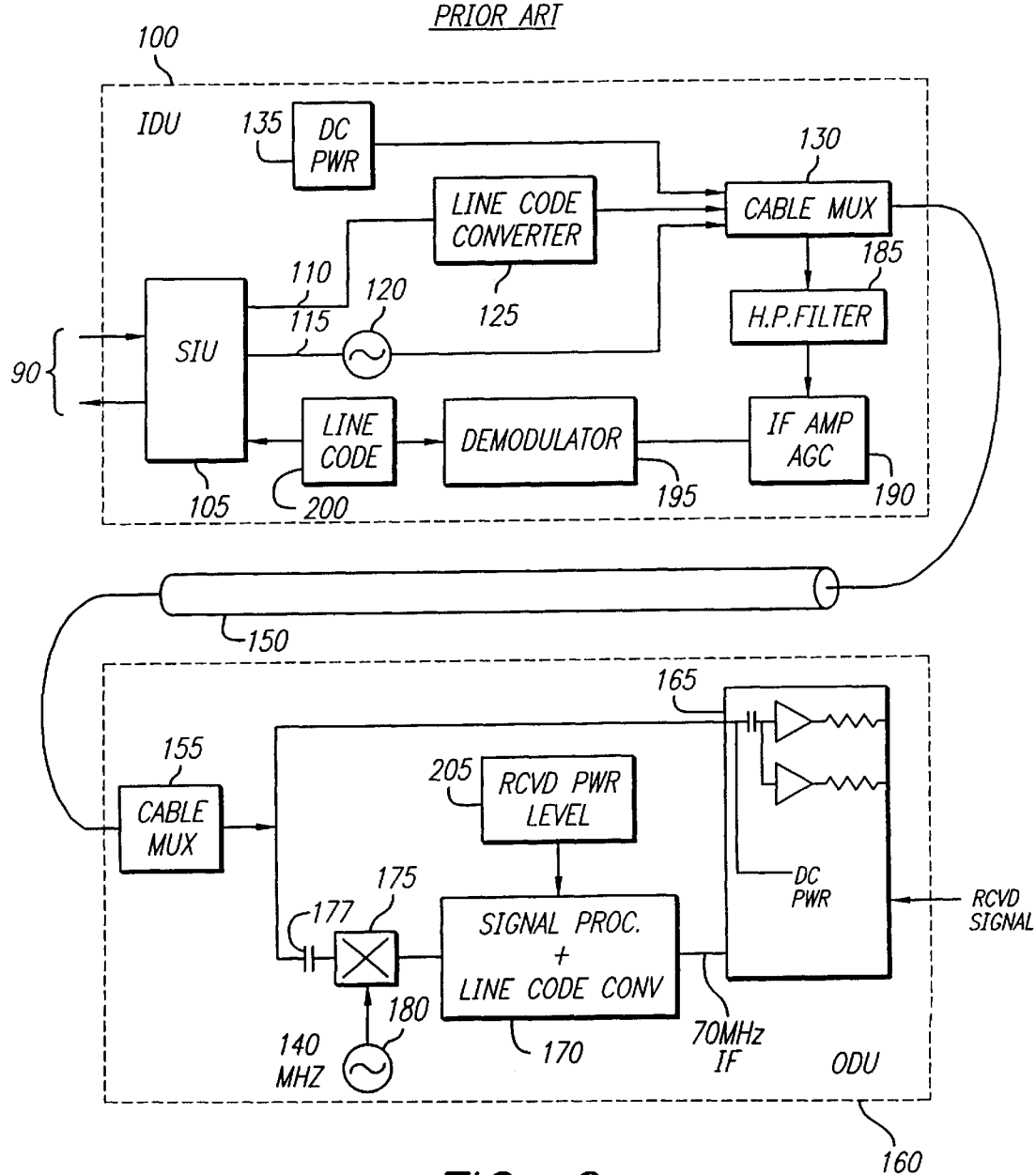
FIG. 2 illustrates in block diagram form a microwave digital radio in accordance with the present invention.

Referring next to FIG. 2, a microwave digital radio in accordance with the present invention may be generally appreciated. In particular, a data input/output 90 communicates a binary data stream to the Indoor Unit, or IDU, shown generally at 100, and in particular with the System Interface Unit portion 105 of the IDU 100. The function of the SIU 105 is, in substantial measure, multiplexing/demultiplexing of the data streams into any of a number of available tributaries including, for example, 2, 4 or 8 or more tributaries, which are then outputted on a line 110. In addition, the System Interface Unit 105 provides a clock signal on a line 115 which may be, for example, on the order of 40 MHz although the clock can vary over a significant range, for example 10 MHz to 100 MHz or more. For clarity, the clock is shown at 120 although it typically forms a portion of the SIU 105.

The data streams out of the SIU on a line 110 are then supplied to a line code converter 125, where they are converted to any of a variety of line codes well known in the art, including AMI or "Alternate Mark Inversion". For purposes of the exemplary embodiment of FIG. 2, the line code will be assumed to be AMI. The AMI data stream is then supplied to a cable mux 130, where it is combined with the clock signal 115. In addition, DC power is supplied at power supply 135, typically through a power inductor (not shown). The cable mux 130 is designed to maintain isolation between the AMI and clock signals while at the same time combining them; the cable mux 130 also typically includes capacitive coupling to isolate the DC power from the remainder of the cable mux.

The cable mux then places the combination of the AMI signal, the clock and DC power on the cable 150, whence it is suppled to what may be thought of as a second cable mux 155 included in the Outdoor Unit, or ODU, shown generally at 160. The cable mux 155 supplies the upstream clock and AMI signals to a transceiver 165, where it is transmitted out on an antenna (not shown). At the same time, data coming in from the antenna is processed by the transceiver in a conventional manner to provide a conventional 70 MHz IF signal. That conventional 70 MHz IF signal is then supplied to signal processing and line code conversion logic 170, which may be better appreciated from FIG. 3. The function of the logic 170 is to demodulate the 70 MHz IF signal and convert it to line code (again assumed to be AMI for purposes of this embodiment); it will be appreciated by those skilled in the art that this process is typically done, in prior art systems, in the System Interface Unit. In the present invention, however, a microprocessor is provided in the Outdoor Unit 160 and the demodulation of the 70 MHz IF signal occurs at the Indoor Unit.

The demodulated-and-line-code-converted output of the logic 170 is then provided to a modulator 175, where it is modulated onto an oscillator signal supplied by oscillator 180 which may be, for example, on the order of 140 MHz although the exact frequency may vary over a substantial range on the order of 80 MHz to 2 GHz. The oscillator frequency is chosen to be as low as possible without interfering with the upstream data and clock. The remodulated signal provides a clean data stream capable of being transported down a cable of substantial length (for example 1000 feet of type 9913 cable although longer lengths are possible with higher quality cables) at constant signal-to-noise ratio on the order of 50 db. The result is a highly reliable signal transport.

The output of the modulator 175 is then supplied to the cable 150 via the cable mux 155 for transport downstream to the Indoor Unit, or IDU, and in particular to the cable mux 130. The downstream signal is separated out from the upstream signals, and supplied to a high pass filter 185 to remove lower frequency artifacts. The resulting signal is then passed through an amplifier stage 190 having automatic gain control, to avoid signal limiting. The resulting signal is then demodulated in demodulator 195 (which may be, for example, a diode). The output of the demodulator 195 is then passed through a line code deconverter 200 to yield a binary data stream. The output data stream from the deconverter 200 is then supplied to the conventional system interface logic 105. The downstream output of the SIU 105 is shown as the output at 90. It will be appreciated by those skilled in the art that various amplifier stages have been left out as not affecting signal flow.

In addition to the significantly improved signal-to-noise ratio, another advantage of the present invention is the ability to monitor received power level at the Outdoor Unit 160. In particular, received power level is measured by logic 205, and supplied to signal processing logic 170. The received power level signal is then incorporated into the signal being sent down the cable in a conventional manner. However, by being able to measure the received power signal at the antenna unit, the error and variation introduced by the cable connecting the ODU to the IDU is eliminated, allowing much more accurate determination of received power. This further permits much more accurate determination of link budget, which can be useful in the design and operation of wireless networks.

Figure 3:
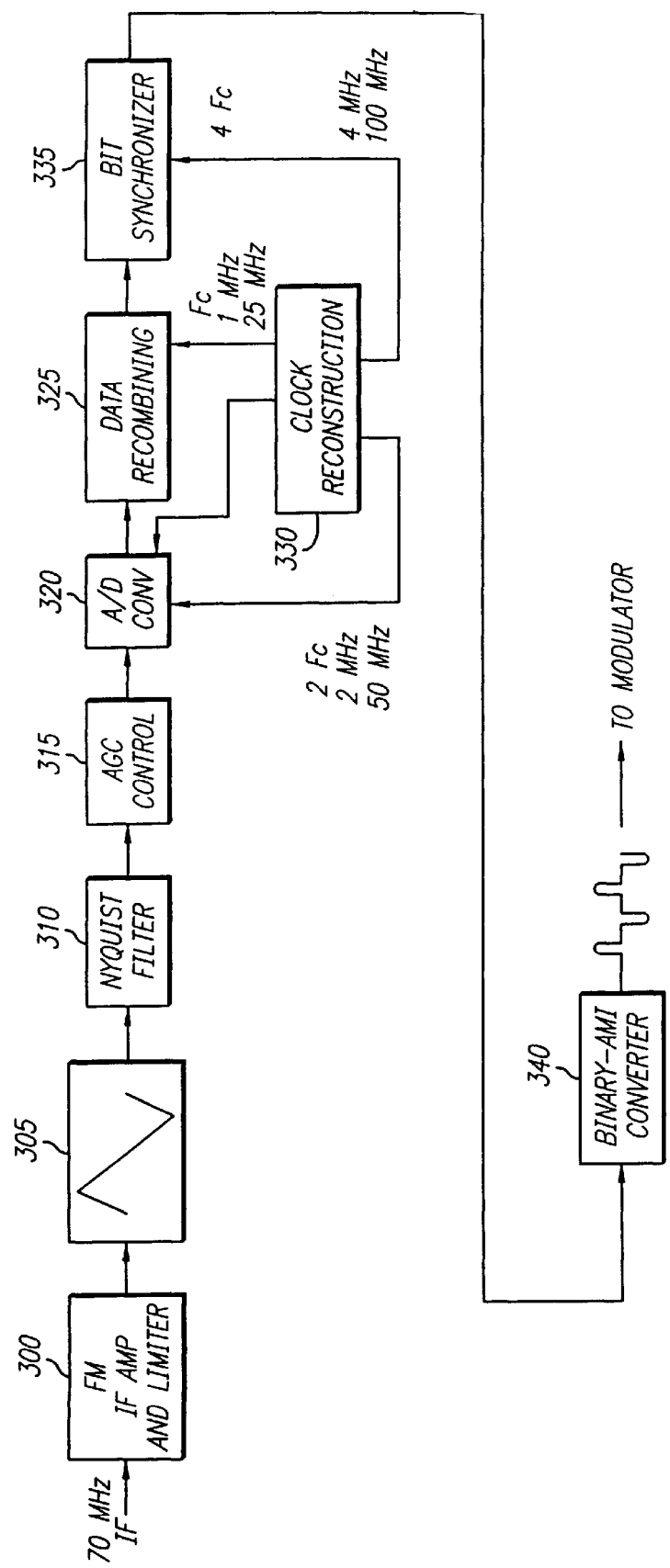
FIG. 3 illustrates one example of a signal processing and line code conversion circuit such as shown generally in FIG. 2.

Referring next to FIG. 3, the signal processing and line code conversion logic 170 of FIG. 2 may be better appreciated. The logic of FIG. 3 is conventional and, while typical, is only one of a number of equally acceptable designs. FIG. 3 is supplied only for purposes of clarity. The 70 MHz IF signal is supplied to an FM IF amplifier and limiter 300, the output of which is then sent through a discriminator 305. The discriminator demodulates the FM signal from the amp and limiter 300, and the resulting signal is provided to a Nyquist filter 310. The Nyquist filter separates the signal into a carrier and multiple sidebands, which are then passed through an AGC control circuit 315. The output of the AGC circuit 315 is then passed through an analog-to-digital (A/D) converter 320 which generates as its output two data streams, together with a third output used to reconstruct the data clock. The dual data 20 streams are supplied to a data recombining circuit 325, which essentially demultiplexes the two data streams into a single data stream. The third output of the A/D converter is supplied to a clock reconstruction circuit 330, which typically rebuilds the data clock based on the zero crossings of the incoming data stream.

The clock reconstruction circuit 330 supplies three clock signals $f_c$ to the A/D converter 320, to the data recombining circuit 325, and to a bit synchronizer circuit 335 (which may be a D flip-flop, for example.) Although all three clock signals supplied by the clock reconstruction circuit are coherent, or in phase, the actual frequencies may differ. For example, the second clock, supplied to the A/D converter, may be $2f_c$, while the third clock, supplied to the bit synchronizer, may be $4f_c$. The relationships between the various clocks are merely exemplary and are not intended to be limiting, as many other relationships between the various clocks are also acceptable. A typical range for $f_c$ may be on the order of 1 MHz to 25 MHz, although even broader ranges are within the realm of reason. The output of the bit synchronizer is binary data, and the binary data stream is then passed through a binary-to-line code conversion circuit 340, resulting in a suitable line code format for the data, such as AMI. The AMI data stream, shown on FIG. 2, is then supplied to the modulator as shown in FIG. 2.

Figure 4:
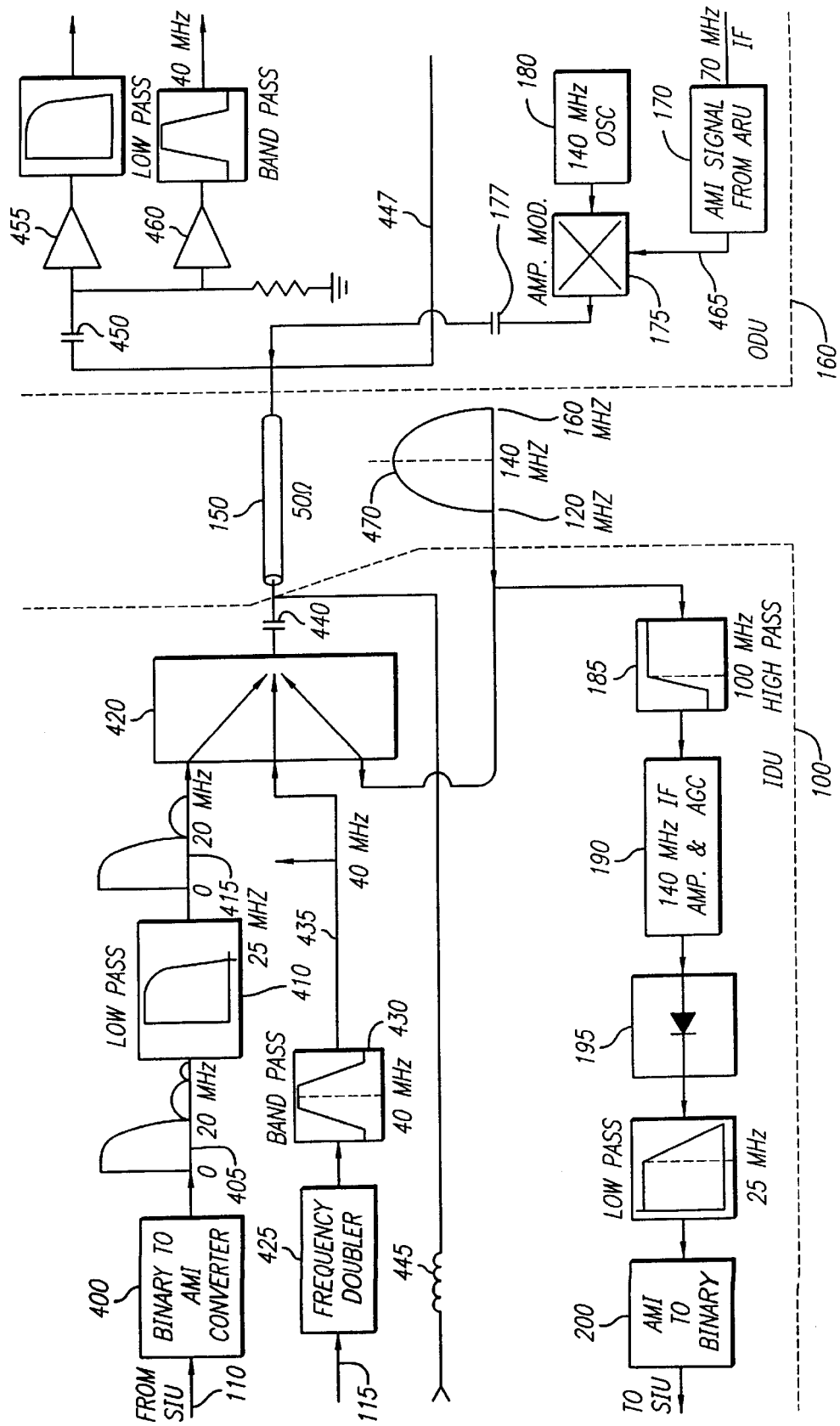
FIG. 4 illustrates in schematic block diagram form the cable interface portions of the digital radio of FIG. 2.

Referring next to FIG. 4, the channel interface portions of the circuit of FIG. 2 may be understood in greater detail. Where appropriate, like elements are shown with like reference numerals. More specifically, the binary digital signal 110 from the SIU can be seen supplied to a binary to AMI converter 400. The resulting baseband waveform, shown at 405 in FIG. 4 and in an exemplary embodiment in the range of 20 MHz, is supplied to a low pass filter 410, typically on the order of 25 MHz for an incoming waveform rolling off at 20 MHz. The output of the low pass filter, shown at 415, is then provided as the data input to a power summer/splitter 420, which may for example be a MiniCircuits SCP-3-1 device.

The SIU also supplies a clock signal, which may for example be on the order of 20 MHz, on line 115. In the exemplary embodiment of FIG. 4, the clock is supplied to a frequency doubler 425, the output of which is passed through a 40 MHz bandpass filter 430. This results in a 40 MHz clock signal, shown at 435, supplied as a second input to the power summer/splitter 420. The summer/splitter 420 allows the signals to sum together while still providing isolation from one another and, as will be appreciated hereinafter, also providing isolation from signals coming downstream. Such isolation is needed because each of the bands has been filtered through its own filter—either lowpass, bandpass and high pass. The signals are matched within their own passbands, but are highly reactive outside their associated passbands. Both the AMI data stream and the clock signal typically have an output impedance on the order of fifty ohms.

The output of the summer/splitter 420 is capacitively coupled to the cable 150. Also coupled to the cable 150, on the outboard side of the capacitive coupling shown at 440, is DC power 135, supplied through a power inductor 445. Power is supplied up the cable to operate the upstream equipment, including the transceiver.

It can therefore be seen that three upstream signals are supplied to the cable 150. At the other end of the cable, in the ODU 160, the power signal 447 is capacitively decoupled from the AMI data 415 and clock 435 by virtue of a capacitor shown at 450. The data signal is then supplied to the transceiver portion of the ODU 160, typically through a buffer amp 455 which provides isolation and impedance matching for the cable. Likewise, the clock signal 435 is provided to the remainder of the transceiver through a buffer amplifier 460.

On the downstream side of the channel interface, the undemodulated intermediate frequency (IF) signal which is representative of the signal sent down the cable in prior art systems, and typically though not necessarily 70 MHz, is received as the input to signal processing and line code conversion logic 170, discussed above. The output of the logic 170 is a conventional AMI signal, shown at 465. The AMI signal is then amplitude modulated, and more typically baseband pulse amplitude modulated, by a modulator 175 onto a carrier signal such as that supplied by an oscillator 180. As discussed in connection with FIG. 2, the oscillator 180 may operate at any of a range of frequencies but in the exemplary embodiment described here operates at 140 MHz. The output of the modulator 175 is shown at 470 as a remodulated signal centered at 140 MHz and extending 20 MHz on either side, and is fed down the cable 150 through capacitive coupling shown at 177.

At the downstream end of the cable 150, the remodulated AMI signal 470 is supplied to the IDU 100 through the capacitor 440 and into the power summer/splitter 420. As with the upstream data and clock signals 415 and 435, the downstream signal 470 is maintained isolated from the remaining signals. The modulated AMI signal 470 is then supplied to a highpass filter 185, a 140 MHz IF amp with AGC 190, and a demodulator 195. The demodulator may, for example, be a diode. The output of the demodulator 195 is then supplied to a low pass filter 475, which may for example exhibit rolloff at 25 MHz and above for a 20 MHz data signal. The output of the lowpass filter will be AMI data, which can then be converted to a binary data stream by passing the AMI data through the AMI to binary deconverter 200. The binary data stream which is the output of the deconverter 200 is then supplied to the conventional remainder of the IDU 100.

It will be appreciated that, because the channel interface described in FIG. 4 handles a total of four signals, specifically upstream AMI data (for transmission), clock, power and downstream (received) AMI data, the channel interface may be referred to in some instances as a quadplexer.

Figure 5:
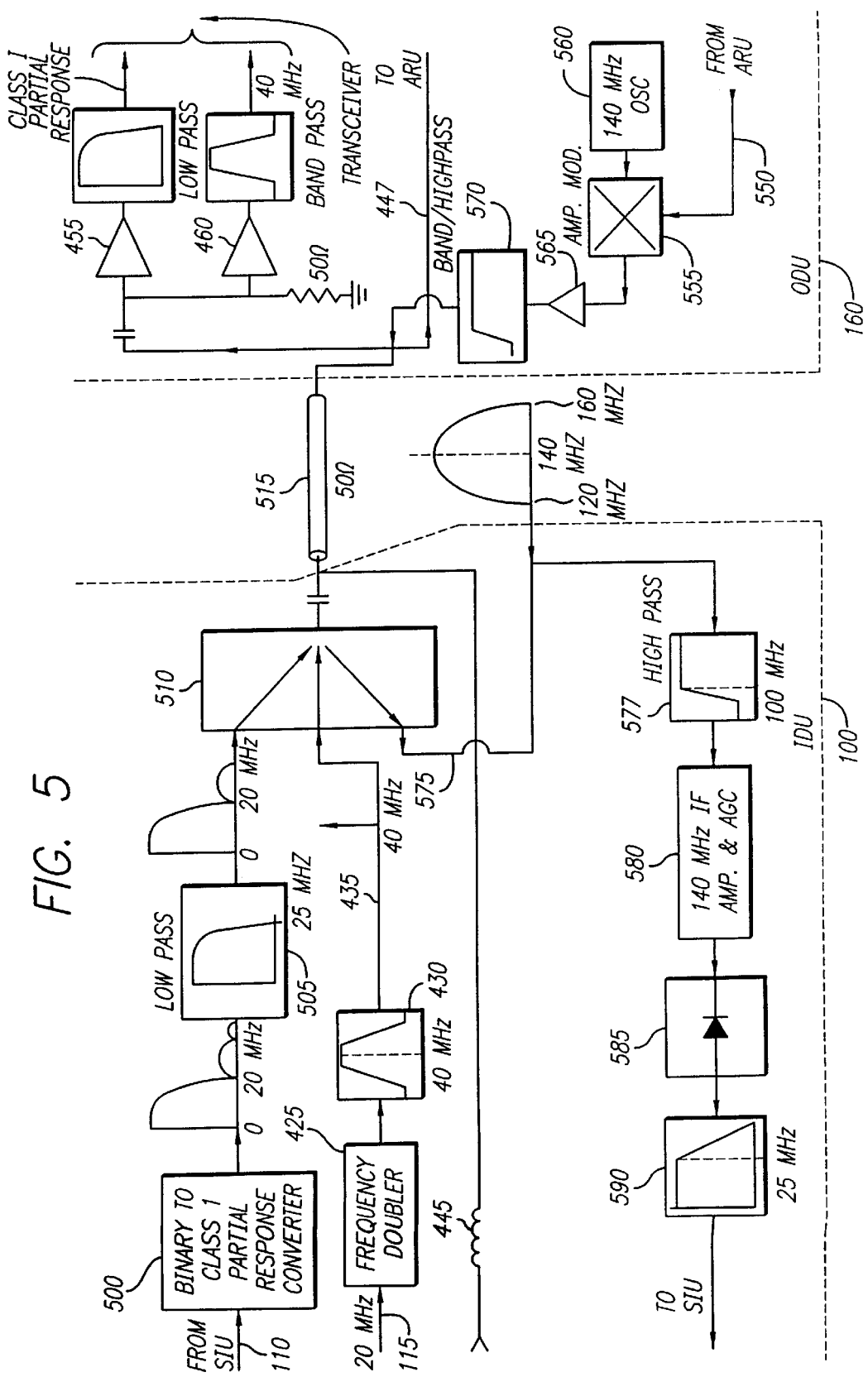
FIG. 5 shows an alternative design for a digital radio in which the line code is partial response.

Referring next to FIG. 5, an alternate embodiment to the channel interface design of FIG. 4 is shown. In particular, while the example shown in FIG. 4 used AMI line code, the embodiment shown in FIG. 5 uses class I partial response line code. Class I partial response offers, at least in some respects, a more robust environment than AMI line code. Partial response line code basically involves the use of double sideband suppressed carrier transmission, and results in less demand for bandwidth for a given information transmission rate and somewhat simplified amplifier design. Partial response line code occupies only one-half the bandwidth of AMI and is more robust because the entire signal is in the sidebands; no power in is the carrier. Only the channel interface portion of the radio of FIG. 5 is shown, as the remainder is identical to that shown in FIG. 2.

Still referring to FIG. 5, a conventional binary digital signal is supplied by the conventional SIU as an input to a two level to three level class I partial response converter 500. The converted data stream is then supplied to a baseband filter 505. The filtered output from the filter 505 is then supplied to a power summer/splitter 510, which provides impedance matching for the cable 515. Similarly, the clock signal 520 from the SIU is doubled in a frequency doubler 425 and filtered through a band pass filter 430, after which the clock signal 435 is provided to the summer/splitter and then summed with the data output from the filter 505 for transmission up the cable 515. At the upstream end of the cable, the partial response data signal and the clock are handled in the same manner as shown in FIG. 4, by being supplied via capacitive coupling to the transceiver portion of the ODU, and in particular buffer amplifiers 455 and 460, respectively. The power signal is also split off and provided to the ODU.

At the receiver side of the ODU, the received data stream is demodulated as discussed in connection with FIG. 2 and deconverted into a binary data stream. The binary data stream is then converted to a partial response line code in a two-level to three-level class I partial response converter, shown at 550. The converted data is then supplied to a doubly-balanced mixer 555 for modulation with a carrier signal from an oscillator 560, which may again be a 140 MHz oscillator. The output of the doubly-balanced mixer is then buffered and amplified in an amplifier 565, and passed through a band pass filter 570 centered at the frequency of the carrier signal, or 140 MHz in this example. Alternatively, the band pass filter 570 can be a simplified high pass filter. The output of the filter 570 is then fed down the cable 515 in the same manner as shown in FIG. 4. Those skilled in the art will appreciate that the filter 570 also provides DC isolation from the power signal 447.

At the downstream end of the cable, the received signal 575 is separated from the remaining signals by a high-pass filter 577, after which the resulting signal is passed through an IF amp (with AGC) 580 similar to the amplifier 190 in FIG. 4. The resulting signal is then demodulated in a demodulator 585 in the same manner as in FIG. 4. The demodulated signal is then passed through, for example, a low pass filter 590, after which the resultant binary data stream is supplied to the conventional portion of the IDU for further processing.

Figure 6:
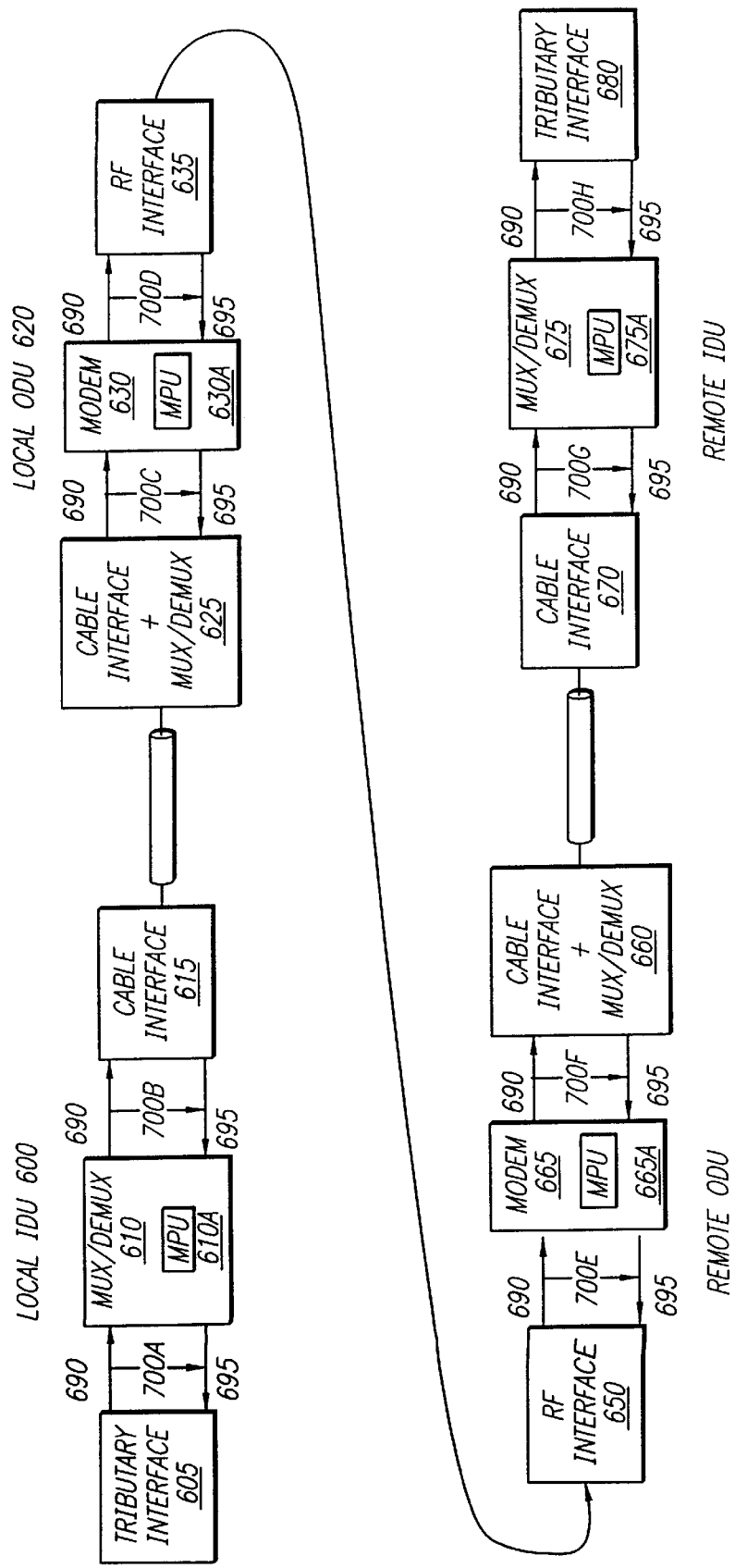
FIG. 6 shows in simplified block diagram form the loop backs available in accordance with the present invention.

Referring next to FIG. 6, certain of the loopback features of the present invention may be understood. For diagnostics purposes, the local indoor unit shown generally as 600 may be broken into three main portions. The first portion is the tributary interface 605, while the second portion is the multiplexer/demultiplexer portion 610 and includes a microprocessor 610A. The third portion is the cable interface 615. Similarly, the local outdoor unit shown generally at 620 may be considered to comprise three elements, the first of which is the cable interface and mux/demux portion shown at 625. The second portion of the ODU is the modem portion 630 and includes a microprocessor 630A, while the third is the RF subsystem, or RF interface, 635. Similarly, for a remote radio, the remote outdoor unit can be broken into the same three subsystems, shown as the RF interface 650, the modem 655 including a microprocessor 655A, and the cable interface and mux/demux portion 660. Also similarly, the remote radio's indoor unit comprises a cable interface portion 670, a mux/demux portion 675 including a microprocessor 675A, and a tributary interface 680. Each of the portions of the indoor and outdoor units is linked internally by an upstream signal path 690 and a downstream signal path 695. In addition, a shunt 700A-H is provided across each of the upstream/downstream pairs 690 and 695.

By use of a control program accessed either automatically or by a technician operating at the indoor unit of the local radio, the microprocessor 61 0A located in the indoor unit of the local radio can write to memory mapped I/O registers associated with each portion 605 through 680 to selectively shunt, or loop back, the associated upstream or outgoing signal onto the downstream or received line at each of the portions of both the indoor and outdoor unit shown in FIG. 6. Thus, the control program can start by establishing a loopback at the output of the local tributary interface 605, test the system, remove the loopback and initiate a loopback at 700B, test the system, remove that loopback and initiate a loopback at 700C, and 20 so on. In this manner each of the internal subsystems can be loopback tested by an technician operating the system from the local IDU. In some instances it may be necessary to provide time out sequences on the remote radio, to avoid having the remote radio locked interminably in loopback mode. This could, in some instances, occur because the remote radio, once entered into loopback mode from the local IDU, could not then execute the instructions from the local IDU to exit from loopback mode.

Figure 7:
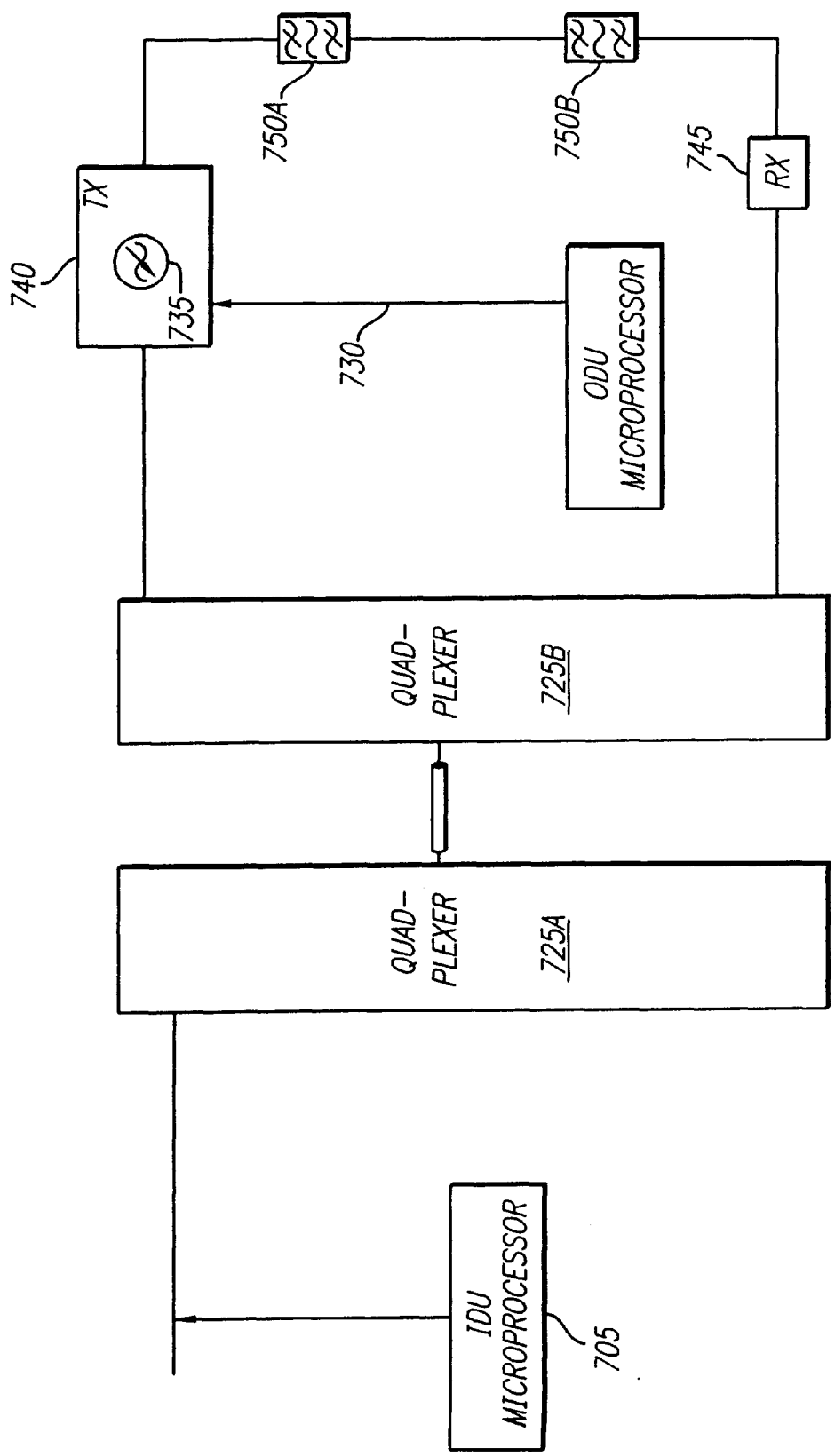
FIG. 7 shows in schematic block diagram form the RF loopback feature of the present invention.

Referring next to FIG. 7, the RF loopback feature of the radio of the present invention may be better appreciated. For digital microwave systems such as those described herein, the transmit and receive frequencies for a given transceiver are typically separated by a frequency offset in the range of 200 MHz to 1500 MHz. An example frequency offset for the 18 GHz frequency band is 1010 MHz. For this example, at the local end of the radio link the operational transmit frequency is 1010 MHz above the receive frequency for the local transceiver, and at the remote end the operational transmit frequency is 1010 MHz below the receive frequency for the remote transceiver.

With continued reference to FIG. 7, the RF loopback function is performed as follows: With the radio set for normal operational mode, the local IDU (through use of its microprocessor) 705 sends a message to the microprocessor 720 in the local ODU through the quadplexers 725A-B, which message effectively mutes the transmitter function of the transceiver or otherwise reduces significantly the transmitter output power. The local IDU 705 then sends a message to the microprocessor in the local ODU to reprogram the frequency synthesizer controlling the transmit frequency, so that the reprogrammed frequency for the local transceiver is the same as the receive frequency for the local transceiver. The microprocessor 720 then sends a frequency programming signal on line 730 to a programmable oscillator 735 in transmitter portion 740 of the ODU. The ability of the transceiver to programmably operate over a range including not only the expected local transceiver operational frequencies but also the expected receive frequencies of the local transceiver is referred to as "frequency agility." Thereafter, the local IDU 705 sends a second message to the microprocessor 720 in the local ODU which unmutes the local transmitter 740, and in at least some instances increases the transmit power to the maximum possible output power.

In the RF loopback mode, the transmit test signal characteristics are substantially the same as for the operational mode, except that the transmit frequency for the local ODU has been changed such that it is equal to the local receive frequency in receiver portion 745 of the local ODU. This mode allows a functional test of the local receiver to be performed by forcing the transmit test signal being forced through the transmit filter section 750A-B of the diplexer and a reduced-level sample of the transmit test signal being injected into the receive filter. The attenuation provided by the transmit filter at the reprogrammed transmit frequency is quite high, typically in the range of 30 to 70 db. The RF loopback test is particularly useful during equipment checkout and troubleshooting during the manufacturing process. Depending on the specific application, after the local and remote terminal equipment is installed in the field, it may be necessary to mute the remote transmitter to ensure that it does not interfere with the RF loopback testing and evaluation. In some instances, such as where the microwave path length is quite short or a high level of interference is present, it may be desirable to disconnect the local ODU from the antenna during the RF loopback testing to eliminate effects from other received signals.

Figure 8:
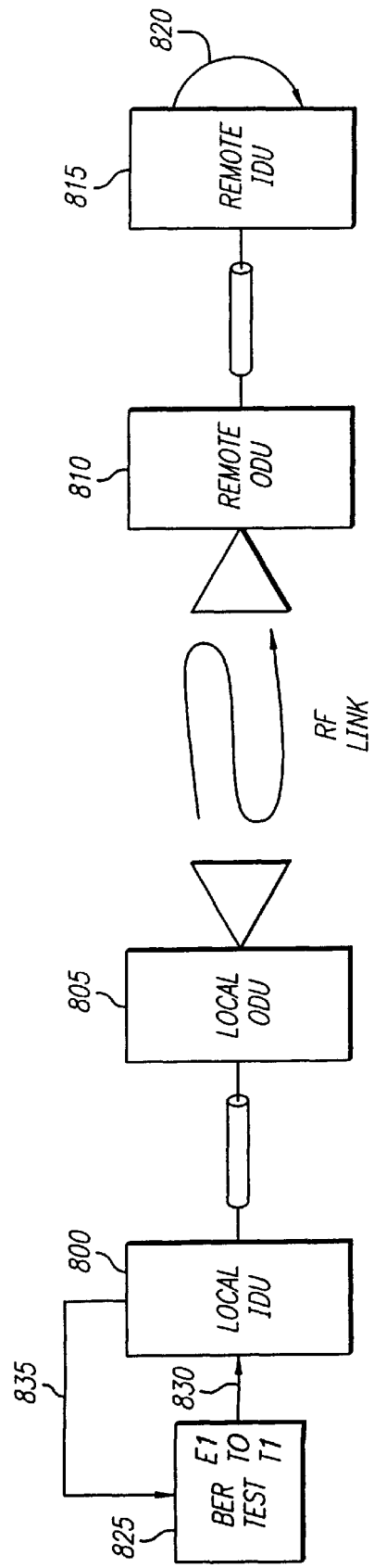
FIG. 8 shows a bit error rate display feature.

Referring next to FIG. 8, yet another feature of the present invention may be understood. A local IDU 800 and a local ODU 805 form a wireless data path when taken in combination with remote ODU 810 and remote ODU 815. A test configuration is established by looping back the tributaries of the remote IDU by performing a remote tributary loopback, shown schematically at 820.

The output of a bit error rate test set capable of generating a known data pattern, typically either E1 or T1, is then connected to the tributary input 830 at the local IDU 800 and the tributary output of the local IDU 835 is then connected to the BER test set's input. It is then possible to adjust the setting of the variable RF attenuator to obtain various bit-error rate values, since the duplex data signal must trvel through the RF attenuator as it goes from the local to remote ODU, and then again must travel through the RF attenuator as it travels back from the remote ODU to the local ODU. Generally, as the attenuator is adjusted from a minimum attenuation setting to a maximum attenuation setting, the BER increases due to weaker receive signal levels at either end of the link. The display of BER is obtained within a BER processor by employing an algorithm which calculates the number of block errors for a fixed number of receive clock pulses. By developing a BER for a standard signal at various data rates, a relationship can be developed during the design phase which shows the relationship between BER for the standard signal and the error rate for the radio. This relationship may then be stored in a lookup table for display as appropriate.

A still further feature of the present invention is the alarm indication signal. For any telecommunications digital transmission equipment, a fundamental requirement is for the equipment to be able to recognize a loss of digital signal and generate an appropriate alarm to indicate to downstream transmission equipment that there is a signal problem upstream that has already been detected. The indication includes suppression of unnecessary alarm indications, thereby avoiding flooding a network management system with such irrelevant alarms.

Using the microprocessor control features of the present invention, as shown in FIGS. 6 and 7, the local microprocessor signals the microprocessor at the remote end of the radio link to insert an alarm indication signal on its relevant digital outputs; this is in contrast to setting the alarm indication at the point of digital input signal failure. If a total radio link failure occurs, the radio terminals seeing loss of RF signal input have the ability to insert AIS independently without stimulus from the microprocessor located at the other end of the link.

It can therefor be appreciated that a new and novel digital microwave radio has been described. It will be appreciated by those skilled in the art that, given the teachings herein, numerous alternatives and equivalents will be seen to exist which incorporate the invention disclosed hereby. As a result, the invention is not to be limited by the foregoing exemplary embodiments, but only by the following claims.

What is claimed is:

1. A method of radio communications with an up-down signal link comprising the steps of:
   a) receiving a downstream signal in a receiver portion of an outdoor unit;
   b) producing in the receiver portion of the outdoor unit an intermediate frequency (IF) signal from the downstream signal;
   c) processing the IF signal in the receiver portion of the outdoor unit to produce a clean line code signal;
   d) processing the clean line code signal in the receiver portion of the outdoor unit to produce a modulated signal; and
   e) providing the modulated signal via an interface portion of the down-link to an indoor unit to be converted to a binary signal,
   wherein the producing and processing, respectively, of the IF, clean line code and modulated signals in the outdoor unit provides a high, constant signal-to-noise ratio on the down-link.

2. A method according to claim 1, the method further comprising the steps of:
   f) providing an upstream signal through an up-link to a transmitter portion of the outdoor unit; and
   g) selecting a component of the upstream signal for transmission by the outdoor unit.

3. A method according to claim 2, the method further comprising the step of:
   g) providing loop-back connections in the indoor and outdoor units for automated testing of the indoor and outdoor units.

4. A method according to claim 1, the method further comprising the step of:
   f) measuring in the receiver portion of the outdoor unit a power level of the received downstream signal,
      wherein the measured power level is unaffected by characteristics of the down-link.

5. A method according to claim 1, wherein the clean line code signal comprises an alternate mark inversion (AMI) line code signal.

6. A method according to claim 1, wherein the clean line code signal comprises a partial response line code signal.

7. A method according to claim 1, wherein the selected component of the upstream signal comprises an alternate mark inversion (AMI) line code signal.

8. A radio communications system with an up-down signal link, the system comprising:
   means within an outdoor unit for receiving a downstream signal;
   means within the outdoor unit for producing an intermediate frequency (IF) signal from the downstream signal;
   means within the outdoor unit for processing the IF signal to produce a clean line code signal;
   means within the outdoor unit for processing the clean line code signal to produce a modulated signal; and
   means within the outdoor unit for providing the modulated signal via an interface portion of the down-link to an indoor unit to be converted to a binary signal,
   wherein the producing and processing, respectively, of the IF, clean line code and modulated signals in the outdoor unit provides a high, constant signal-to-noise ratio on the down-link.

9. A system according to claim 8, the system further including:
   means within the indoor unit for providing an upstream signal through an up-link to a transmitter portion of the outdoor unit; and
   means within the outdoor unit for selecting a component of the upstream signal for transmission by the outdoor unit.

10. A system according to claim 9, the system further including:
    means for providing loop-back connections in the indoor and outdoor units for automated testing of the indoor and outdoor units.

11. A system according to claim 8, the system further including:
    means within the outdoor unit for measuring a power level of the received downstream signal,
    wherein the measured power level is unaffected by characteristics of the down-link.

12. A system according to claim 8, wherein the radio communication comprises microwave communications.

13. A radio communications system with an up-down signal link, the system comprising:
    an indoor unit including:
       means for providing an upstream signal comprising a DC power component, a clock signal component and a line code signal component, and
       means for producing a binary data signal from a downstream signal; and
    an outdoor unit coupled via and up-down link to the indoor unit, the outdoor unit including:
       means for selecting the line code component for transmission, and
       means for providing the downstream signal which is produced from a signal received by the outdoor unit, the downstream signal being a modulated signal produced in the outdoor unit by processing the received signal to produce an intermediate frequency (IF) signal, by processing the IF signal to produce a clean line code signal, and by processing the clean line code signal to produce a modulated signal,
    wherein the producing and processing, respectively, of the IF, clean line code and modulated signals in the outdoor unit provides a high, constant signal-to-noise ratio on the down-link.

14. A system in accordance with claim 13, in which the outdoor unit further includes means for measuring a power level of the received signal, wherein the measured power level is unaffected by characteristics of the downlink.

15. A system in accordance with claim 13, the system further including:
    means for providing loop-back connections in the indoor and outdoor units for automated testing of the indoor and outdoor units.

16. A radio communications system with an up-down signal link, the system comprising:
    a local indoor unit;
    a local outdoor unit coupled to the indoor unit via a local up-down link;
       a remote outdoor unit coupled to the local outdoor unit via a radio-frequency (RF) link, each of the local and remote outdoor units including a first RF-interface portion, a modem portion coupled to the first RF-interface portion via a first segment of an outdoor upstream-downstream paths pair, a second RF-interface portion coupled to the modem portion via a second segment of the outdoor upstream-downstream paths pair, a shunt across each segment of the outdoor upstream-downstream paths pair, and a processor for selectively controlling the shunts; and
       a remote indoor unit coupled to the remote outdoor unit via a remote up-down link, each of the local and remote indoor units including a first interface portion, a multiplexer-demultiplexer portion coupled to the first interface portion via a first segment of an indoor upstream-downstream paths pair, a second interface portion coupled to the multiplexer-demultiplexer portion via a second segment of the indoor upstream-downstream paths pair, a shunt across each segment of the indoor upstream-downstream paths pair, and a processor for selectively controlling the shunts,
    wherein the selectively controlling the shunts provides a loop-back for an upstream or downstream signal at each portion of the outdoor and indoor units, and wherein the loop-backs allow an automatic test of the system.

17. A system in accordance with claim 16, wherein each of the local and remote outdoor units includes means for providing a downstream signal which is produced from a signal received by the respective outdoor unit, each of the downstream signals being a modulated signal produced in their respective outdoor unit by processing the received signal to produce an associated intermediate frequency (IF) signal, by processing the associated IF signal to produce an associated clean line code signal, and by processing the associated clean line code signal to produce the modulated signal,
    wherein the producing and processing, respectively, of the IF, clean line code and modulated signals in the respective outdoor units provides a high, constant signal-to-noise ratio on the associated down-link.

18. A computer readable medium including program instructions executed in a radio communications system with an up-down signal link, the program instructions for:
   a) selectively controlling shunts across segments of an indoor upstream-downstream paths pair;
   b) selectively controlling shunts across segments of an outdoor upstream-downstream paths pair;
   c) muting a transmitter portion of the outdoor unit;
   d) reprogramming a transmit frequency of the transmitter portion; and
   e) un-muting the transmitter portion,
   wherein the selectively controlling the shunts provides a loop-back for an upstream or downstream signal at each portion of the outdoor and indoor units, and wherein the loop-backs allow an automatic test of the system.

19. A computer readable medium according to claim 18, wherein the reprogrammed transmitter frequency is matched with a receive frequency of a receiver portion.

* * * * *

UNITED STATES PATENT AND TRADEMARK OFFICE
CERTIFICATE OF CORRECTION

PATENT NO. : 5,987,060
DATED : November 16, 1999
INVENTOR(S) : Jean-Francois Grenon et al.

It is certified that error appears in the above-identified patent and that said Letters Patent are hereby corrected as shown below:

Column 12, line 14, change "downlink" to --down-link--

Signed and Sealed this

Twenty-seventh Day of June, 2000

*Attest:*

Q. TODD DICKINSON

*Attesting Officer*     Director of Patents and Trademarks